US011348003B2

(12) United States Patent
Adibowo

(10) Patent No.: US 11,348,003 B2
(45) Date of Patent: May 31, 2022

(54) MACHINE-LEARNING-BASED ETHICS COMPLIANCE EVALUATION PLATFORM

(71) Applicant: SAP SE, Walldorf (DE)

(72) Inventor: Sasmito Adibowo, Singapore (SG)

(73) Assignee: SAP SE, Walldorf (DE)

(*) Notice: Subject to any disclaimer, the term of this patent is extended or adjusted under 35 U.S.C. 154(b) by 854 days.

(21) Appl. No.: 16/170,183

(22) Filed: Oct. 25, 2018

(65) Prior Publication Data
US 2020/0134440 A1 Apr. 30, 2020

(51) Int. Cl.
*G06N 3/08* (2006.01)
*G06F 3/04847* (2022.01)

(52) U.S. Cl.
CPC ............ *G06N 3/08* (2013.01); *G06F 3/04847* (2013.01)

(58) Field of Classification Search
CPC ........ G06N 3/08; G06N 3/0454; G09B 19/00; G06F 3/04847
See application file for complete search history.

(56) References Cited

U.S. PATENT DOCUMENTS

| | | | |
|---|---|---|---|
| 9,495,593 B2* | 11/2016 | Chukka | G06F 21/6209 |
| 10,635,502 B2 | 4/2020 | Adibowo | |
| 10,643,074 B1* | 5/2020 | McAninly | G06K 9/00744 |
| 10,671,854 B1* | 6/2020 | Mahyar | G06K 9/00751 |
| 10,679,070 B1* | 6/2020 | Poutivski | G06K 9/00765 |
| 2009/0234831 A1* | 9/2009 | Ebadollahi | G06F 16/48 |
| 2016/0162576 A1* | 6/2016 | Arino de la Rubia | G06F 40/279 707/739 |
| 2016/0350675 A1* | 12/2016 | Laks | G06N 20/20 |
| 2018/0276565 A1* | 9/2018 | Brandao | G06N 20/00 |
| 2019/0073593 A1* | 3/2019 | Luo | G06N 3/088 |

* cited by examiner

*Primary Examiner* — Amy M Levy
(74) *Attorney, Agent, or Firm* — Fish & Richardson P.C.

(57) ABSTRACT

Methods, systems, and computer-readable storage media for receiving digital content, receiving a set of locales, generating a set of ethics ratings by processing the digital content through a plurality of machine-learning (ML) models to provide a set of ethics ratings, each ML model in the plurality of ML models being specific to a locale of the set of locales, each ethics rating in the set of ethics ratings being specific to a locale of the set of locales, and providing the set of ethics ratings for the digital content for the selected locales to the user.

20 Claims, 7 Drawing Sheets

US 11,348,003 B2

MACHINE-LEARNING-BASED ETHICS COMPLIANCE EVALUATION PLATFORM

BACKGROUND

Compliance with local ethics standards is crucial for the effective dissemination of digital content. The consequences of disseminating digital content that does not comply with the local ethics standards of the targeted locales can be severe, ranging from poor product sales to legal penalties, and/or fines.

Dissemination of an item of digital content had been contained to a single country or region, within which the ethics were relatively uniform, and were either already known or easily discovered by the person or entity disseminating the digital content. However, as society has become increasingly globalized and interconnected, significant amounts of digital content are disseminated globally across multiple locales. Ethical standards for dissemination of digital content can vary greatly between different countries and regions, and many of these ethics standards may be unfamiliar to persons or entities disseminating the digital content. For example, some content that is widely accepted in one society or locale may be seen as offensive in another society or locale.

These differences in ethics standards between locales, and the fluidity with which digital content travels makes maintaining compliance with local ethical standards challenging. This challenge is particularly pronounced for individuals and smaller entities, which often do not have sufficient resources to obtain expert ethics opinions for a multitude of locales prior to dissemination of their digital content. Additionally, the number of qualified ethics experts for certain locales is limited, making it extremely difficult to obtain an ethics opinion for those locales.

SUMMARY

Implementations of the present disclosure are directed to ethics standard compliance evaluation. More particularly, implementations of the present disclosure are directed to an ethics compliance evaluation platform that leverages machine-learning (ML) for efficient, multi-locale evaluation of digital content.

In some implementations, actions include receiving digital content, receiving a set of locales, generating a set of ethics ratings by processing the digital content through a plurality of machine-learning (ML) models to provide a set of ethics ratings, each ML model in the plurality of ML models being specific to a locale of the set of locales, each ethics rating in the set of ethics ratings being specific to a locale of the set of locales, and providing the set of ethics ratings for the digital content for the selected locales to the user. Other implementations of this aspect include corresponding systems, apparatus, and computer programs, configured to perform the actions of the methods, encoded on computer storage devices.

These and other implementations can each optionally include one or more of the following features: each ML model in the plurality of ML models is provided as a neural network; each ML model is specific to a type of the digital content; training data used to train each of the ML models comprises digital content and associated ethics ratings for a plurality of locales provided from one or more of online sources, user feedback, and ethics ratings generated by members of an ethics board; the digital content includes one or more of an image, text, audio, video, and combinations thereof; receiving feedback from a user, the feedback comprising a level of agreement the user has with respect to one or more ethics ratings in the set of ethics ratings; and each ethics rating in the set of ethics ratings includes a compliance rating and an inappropriateness rating that are specific to a locale of the set of locales.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
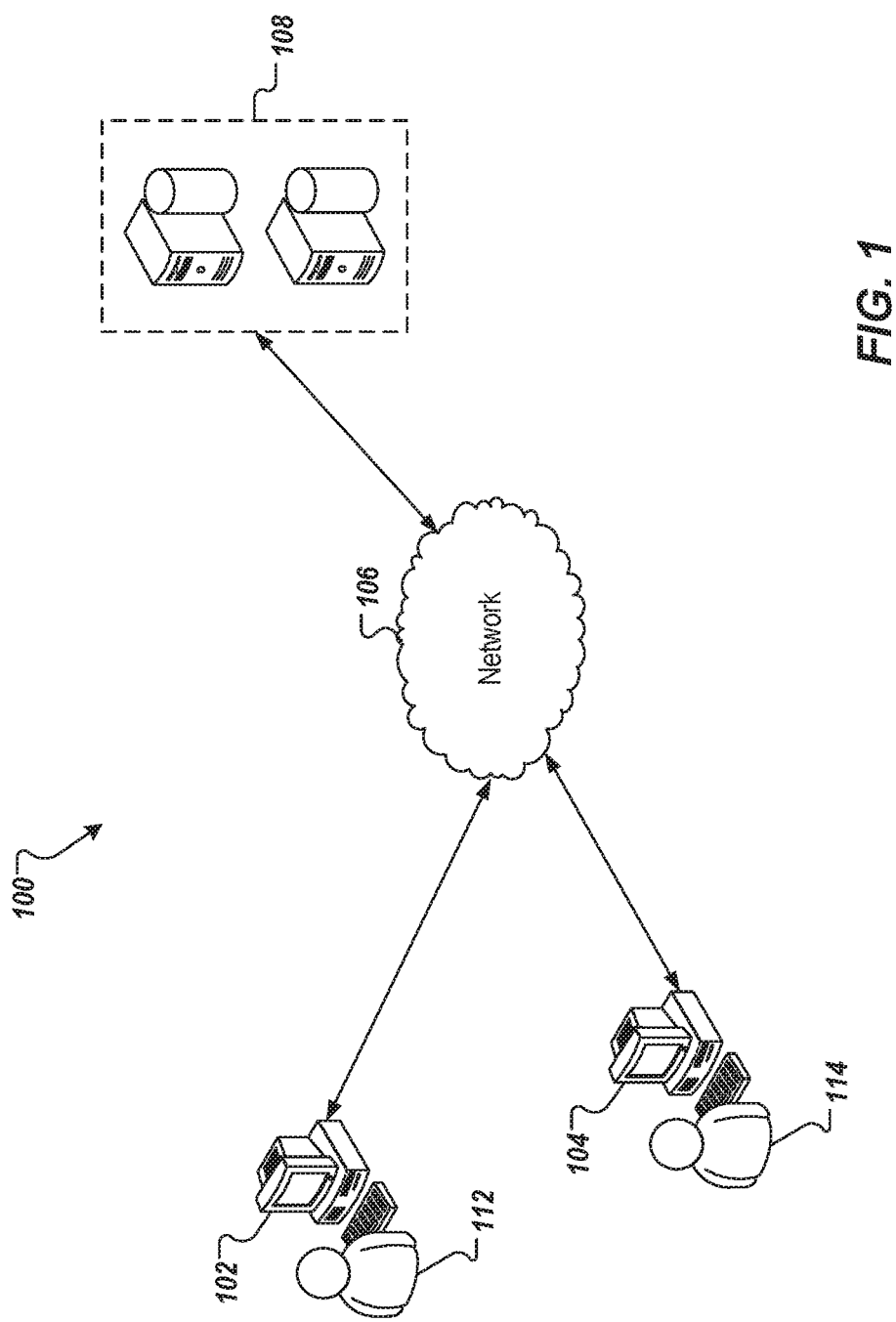
FIGS. 1 and 2 depict example architectures that can be used to execute implementations of the present disclosure.

Implementations of the present disclosure are directed to ethics standards compliance evaluation. More particularly, implementations of the present disclosure are directed to an ethics compliance evaluation platform that leverages machine-learning (ML) for efficient, multi-locale evaluation of digital content. Implementations can include actions of receiving digital content, receiving a set of locales, generating a set of ethics ratings by processing the digital content through a plurality of machine-learning (ML) models to provide a set of ethics ratings, each ML model in the plurality of ML models being specific to a locale of the set of locales, each ethics rating in the set of ethics ratings being specific to a locale of the set of locales, and providing the set of ethics ratings for the digital content for the selected locales to the user.

As introduced above, implementations of the present disclosure are directed to multi-locale ethics compliance verification using a ML-based, ECE platform. Ethics compliance verification of digital content is useful in numerous applications. Example applications include, without limitation, dissemination of digital content for advertising, television broadcasting, book publishing, and artistic purposes. In some examples, a single item of digital content, such as an image or a video, is disseminated to viewers across multiple regions and locales. In order to effectively disseminate the digital content, the digital content must comply with the local ethics standards of each region or locale in which the content is being disseminated. Differences in local ethics standards between different locales makes verification of compliance with local ethics standards for multi-locale dissemination of digital content extremely challenging.

Traditionally, verification of a piece of digital content's compliance with local ethics standards for a particular locale is achieved by obtaining a written opinion regarding the content's compliance with local ethics standards from a person with expert knowledge of the ethics of the particular locale. However, obtaining an expert opinions on the compliance of a single item of digital content with the local ethics standards for each locale in which the digital content is being disseminated is often time consuming and requires extensive financial resources. Additionally, the number of ethics experts for certain locales is limited, making it extremely difficult to obtain an ethics opinion for those locales.

In view of the above context, implementations of the present disclosure are directed to an ECE platform that leverages machine-learning for efficient, multi-locale evaluation of digital content. As described in further detail herein implementations of the present disclosure provide for verification of the ethics compliance of digital content. Example digital content can include, without limitation, images, text, audio, and videos. The ECE platform of the present disclosure includes computer-implemented, ML-based analysis of digital content to provide an ethics rating based on relevant ethics standards of specified locale(s).

In general, and as described in further detail herein, implementations of the present disclosure process digital material from a known source and locale, hence known ethical compliance classification. In some examples, digital material is classified by a panel of experts for ethical compliance against various locales, where the experts ultimately converge on the ethical compliance level (or score, or appropriateness) of a given digital material and given locale. In this manner, training data is provided for training a set of ML models against the digital material samples and their respective locale compliance classifications. Each ML model classifies new digital material (e.g., submitted by customer-users) to evaluate the ethical compliance of the digital materials against various locales.

In some examples, customer-users submit new digital materials for the purpose of improving the ML models' future classification capabilities (both in the breadth of locales or accuracy in assessing a given media type for a given locale). In some examples, operators of the ML models (e.g., the entity that provides services ultimately rendered by the ML models) obtain new digital materials for further training and subsequent improvement of the ML models' future classification capabilities (i.e. upload the training data coming from online sources with known ethical compliance ratings).

In some implementations, a set of web-based user interfaces are provided to enable uploading of digital material to have it classified against various locales' ethical compliance standards. Furthermore, the interfaces provide a channel for customer-users to submit feedback to the system to improve its future classifications. In some implementations, a set of web-based user interfaces are provided for a panel of experts to review incoming unclassified digital materials, and provide their classification of the material against locales as well as communicating between panel members to reach an agreement.

In some implementations, a set of components automatically obtain digital material samples from online sources. In some implementations, a set of components are provided to train ML models based on already-classified digital materials, maintain those trained ML models, and make them available for use by the end users, and/or panel of experts through their respective user interfaces.

FIG. 1 depicts an example architecture 100 in accordance with implementations of the present disclosure. In the depicted example, the example architecture 100 includes one or more client devices 102, 104, a network 106, and a server system 108. The server system 108 includes one or more server devices and databases (e.g., processors, memory). In the depicted example, respective users 112, 114 interact with the client devices 102, 104. In an example context, the users 112, 114 can include publishers of digital content, and/or compliance officers for checking ethical compliance of digital content.

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, and as noted above, the server system 108 can host an ECE platform (e.g., provided as one or more computer-executable programs executed by one or more computing devices). For example, input digital content (e.g., images, text data, audio, videos, a plurality of locales) can be provided to the server system 108 (e.g., from the client device 102), and the server system 108 can process the input digital content through the ECE platform to provide a set of ethics ratings. For example, the server system 108 can send the set of ethics ratings to the client device 102 over the network 106 to display to the user 112.

Figure 2:
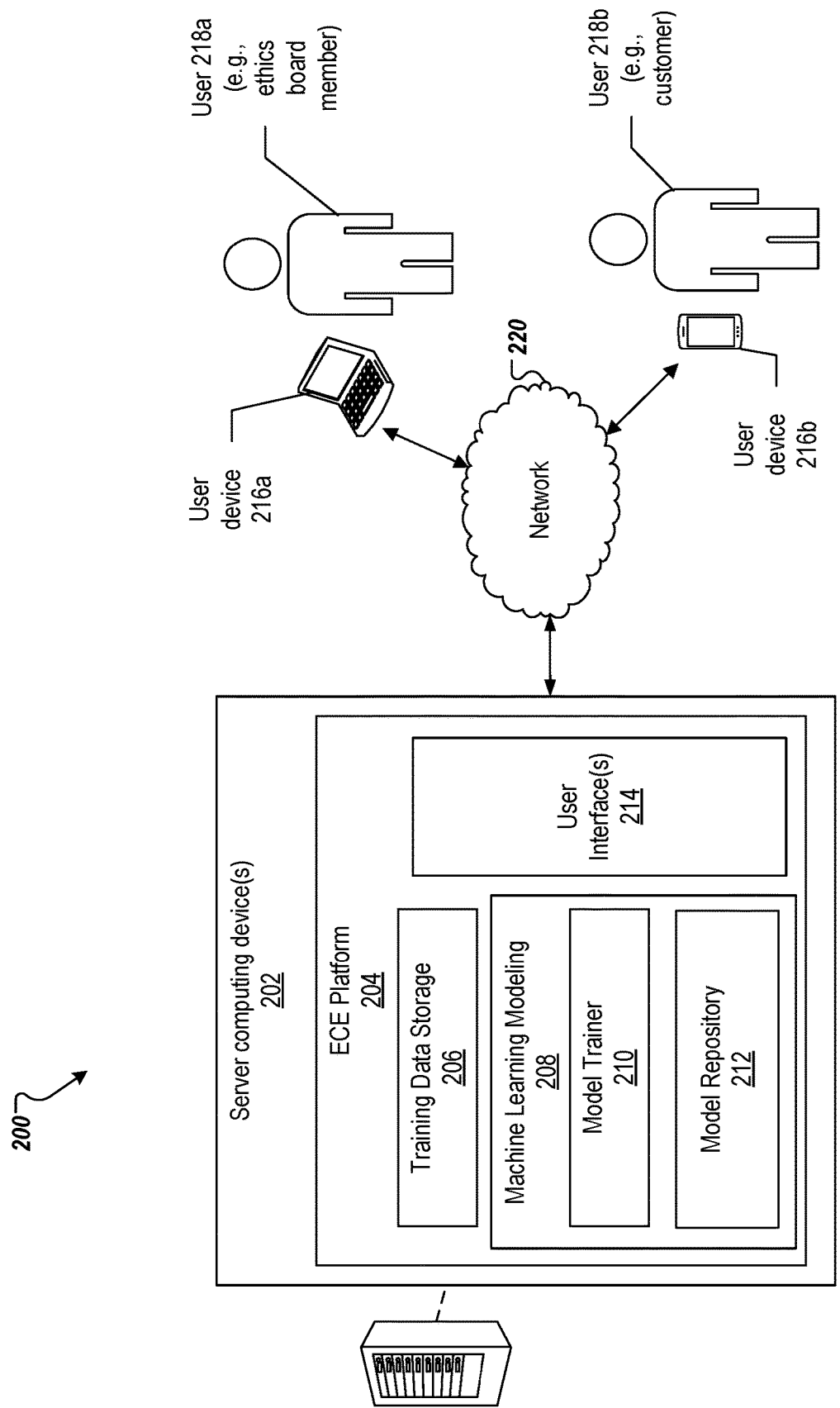

FIG. 2 depicts an example architecture 200 in accordance with implementations of the present disclosure. In the depicted example, the example architecture 200 includes one or more user devices 216a, 216b, a network 220, and a server system 202. The server system 202 includes one or more server devices and databases (e.g., processors, memory). In the depicted example, respective users 218a, 218b interact with the user devices 216a, 216b. In an example context, the users 218a, 218b can include software developers, who interact with an ECE platform 204 hosted by the server system 202 to evaluate digital content ahead of publication.

In some examples, the client devices 216a, 216b communicate with the server system 202 over the network 220. In some examples, the client devices 216a, 216b can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 220 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 202 includes at least one server and at least one data store. In the example of FIG. 2, the server system 202 is intended to represent various forms of servers including, but not limited to a web server, an application server, a proxy server, a network server, and/or a server pool. In general, server systems accept requests for application services and provides such services to any number of client devices (e.g., the client devices 216a, 216b over the network 220).

In accordance with implementations of the present disclosure, and as noted above, the server system 202 can host the ECE platform 204. In the depicted example, the ECE platform 204 includes training data storage 206, a ML modeling module 208, and one or more user interfaces (UIs) 214. In some implementations, the ML modeling module 208 provides multiple ML models. In some implementations, the ML modeling module 208 includes a model trainer 210, and a model repository 212. In some implementations, the ML modeling module 208 applies ML techniques to train two or more ML models. As described in further detail herein, the ML models are used to determine, based on a plurality of specified locales, the level of compliance a specific item of digital content has with the ethics standards of each of the plurality of specified locales.

The training data storage 206 stores training for training the ML models. In some implementations, training data includes a plurality of digital content and associated ethics ratings for respective locales. In some implementations, the training data includes digital content and associated ethics ratings for a plurality of locales obtained from online sources, user feedback, and/or ethics ratings generated by members of one or more ethics boards (e.g., ethics boards of respective locales). The training data storage 206 can store data using any suitable data storage format. The model repository 212 stores ML models trained by the model trainer 210.

The UIs 214 provide various views into information regarding ethics ratings for a specific item of digital content, as described in further detail herein. Various types of users 218a, 218b, such as members of an ethics board, customers, and so forth may access the UIs 214 according to their roles and the access permissions associated with their roles. The users 218a, 218b may employ various types of user devices 216a, 216b to access the UIs 214. The ECE platform 204 can support various types of UIs 214. For example, one or more of the UIs 214 may be rendered in applications (apps) executing on the user device(s) 216a, 216b. As another example, one or more of the UI(s) 214 may be rendered as web page(s) in browsers executing on the user devices 216a, 216b.

In accordance with implementations of the present disclosure, an ECE platform (e.g., the ECE platform 204 of FIG. 2) processes items of digital content to determine a level of compliance each item of digital content has with respect to ethics standards of a specific locales. In further detail, implementations of the present disclosure include a plurality of ML models (e.g., stored in the model repository 212 of FIG. 2) that process the items of digital content to provide a set of ethics ratings for respective locales.

In some examples, the ECE platform 204 provides various UIs (e.g., the UIs 214 of FIG. 2) that users can access to submit digital content for ethics classification, and/or to review ethics ratings for submitted digital content. For example, a user can submit an item of digital content, select a plurality of locales, for which ethics evaluation of the digital content is requested, and receive a set of ethics ratings for the digital content. In some examples, each ethics rating in the set of ethics ratings is specific to a locale of the plurality of locales. Types of digital content submitted to the data rating system can include, without limitation, images, text, audio, videos, and/or a combination thereof.

In some implementations, the ML models process the digital content to generate indications of whether the digital content items have a certain associated property or properties. Example properties can include, without limitation, probabilities that the digital content has a particular property, such as whether the digital content is ethical or unethical for a specific locale of a plurality of locales. In some examples, the property is provided as an ethics rating, described in further detail herein.

In some examples, ethics ratings provided by the ML models include a compliance rating, and an inappropriateness rating. For example, the compliance rating comprises a scalar value indicating the probability that the submitted digital content is considered ethical in a specified locale. The inappropriateness rating is provided a scalar value indicating the probability that the submitted digital content is considered unethical in a specified locale. In some examples, each of the compliance rating, and the inappropriateness rating has a value within a range (e.g., 0 . . . 1). In some examples, a compliance rating of 1 indicates that the ECE platform is highly confident that the digital content is appropriate for consumption within the respective locale. In some examples, a compliance rating of 0 indicates that there is little to no confidence that the digital content is appropriate for consumption in the respective locale. In some examples, an inappropriateness rating of 1 indicates a high-confidence that the material would be viewed as obscene, or indecent for the respective locale. An inappropriateness value of 0 indicates that the ECE platform has no confidence in providing judgment. Although the examples provided above are at the outer edges of an example range (0 . . . 1), it is contemplated that the values may often lie within the example range (e.g., 0.792, 0.350, 0.556).

As part of the training of the ML models, a set of training data is provided (e.g., stored in the training data storage 206 of FIG. 2). In some examples, the training data includes a positive set of training data items that have been determined to have the propert(y/ies) in question (e.g., digital content determined to be ethical for a specified locale). In some implementations, the training data includes a negative set of training data items that lack the propert(y/ies) in question (e.g., digital content determined to be unethical for a specified locale).

In some implementations, training data is provided from digital content that has been distributed to members of one or more ethics boards. In some examples, an ethics board can include persons with expert knowledge of the ethics of one or more locales. In some example, the ethics board members receive the digital content through a UI of the ECE platform, and review the digital content for its level of compliance with the local ethics standards of the locales of the member's expertise. The board members provide an ethics rating for the digital content for the locales of their respective expertise through the UI. For example, a member can provide input indicating that the digital content is either ethical, or unethical for the specified locale(s).

In some implementations, the ECE platform receives the ethics ratings for the digital content for the plurality of locales submitted by the board members. The ECE platform tallies the ratings to determine whether a sufficient portion of the ratings received from the board members for the digital content for a specified locale are in agreement. If a sufficient portion of the received ratings for the digital content for a specified locale are in agreement, an ethics rating of either ethical or unethical, as appropriate, is assigned to the digital content for the specified locale. In some implementations, at least 51% of the board member ratings for the digital content for a specified locale must be in agreement in order for the system to assign an ethics rating for the digital content for the specified locale. The digital content and associated ethics ratings for the plurality of locales generated by the system based on board member ratings are stored as training data in a training data storage module of the system.

In some implementations, training data is generated from digital content received by the data rating system from online sources. Digital content is received by the ECE platform from the online sources. Based on the source of the digital content, the ECE platform automatically labels the digital content with an ethics rating of either ethical or unethical, as appropriate, for a specified locale(s). For example, a specific item of digital content received from an online financial publication known in a specific locale(s) to be ethical will automatically be classified as ethical for the specific locale(s). In another example, a specific item of digital content received from an online tabloid publication known in a specific locale(s) to be unethical will automatically be classified as unethical for the specific locale(s). The digital content and associated ethics ratings for the specified locale(s) are stored as training data.

In some implementations, training data is provided from digital content received by the ECE platform from users, the users submitting digital content with associated ethics ratings. For example, a user can upload a specific item of digital content that is of known repute for a specific locale(s). The user specifies within a UI that the uploaded item of digital content is either ethical or unethical for the specific locale(s). The digital content and associated ethics ratings for the specified locale(s) is stored as training data.

In some implementations, training data is provided from digital content received by the ECE platform from submissions of digital content by customer users. Customer users submit digital content and a plurality of locales, for which ethics ratings for the content are requested through a UI. As described in further detail herein, the ECE platform processes the digital content and provides the customer user with an ethics rating for the digital content for each of the plurality of specified locales. The customer user is also provided the option to submit feedback to the system regarding the set of ethics ratings. Feedback provided by the user and received by the ECE platform can include a statement for each rating in the set of ratings that the user either agrees with the rating or disagrees with the rating. The ECE platform stores the digital content submitted by the customer user, the ratings for the digital content provided by the ECE platform, and the customer user feedback as training data.

In some implementations, the training data includes a plurality of items of digital content and a plurality of associated ethics ratings for a plurality of locales. In some implementations, the ethics ratings for the items of digital content stored as training data indicate that the item as either ethical or unethical for each locale of a plurality of locales.

In some implementations, the ECE platform trains multiple ML models using the training data stored in training data storage. In some implementations, each ML model is trained using training data associated with a specific locale. That is, each ML model is specific to a respective locale. For example, a ML model is trained using training data with ethics ratings for the United States of America (the U.S.). In this example, the ML model is specific to the U.S. In some implementations, a ML model is trained using training data of a respective type of digital content, and for a respective locale. For example, a ML model can be trained using training data that includes images with ethics ratings for France. In this example, the ML model is specific to images, and to France.

In some implementations, the ML models are provided as neural networks. In some implementations, the ECE platform uses supervised machine learning to train the ML models. Any appropriate training technique can be used to train the ML models.

Figure 3A:
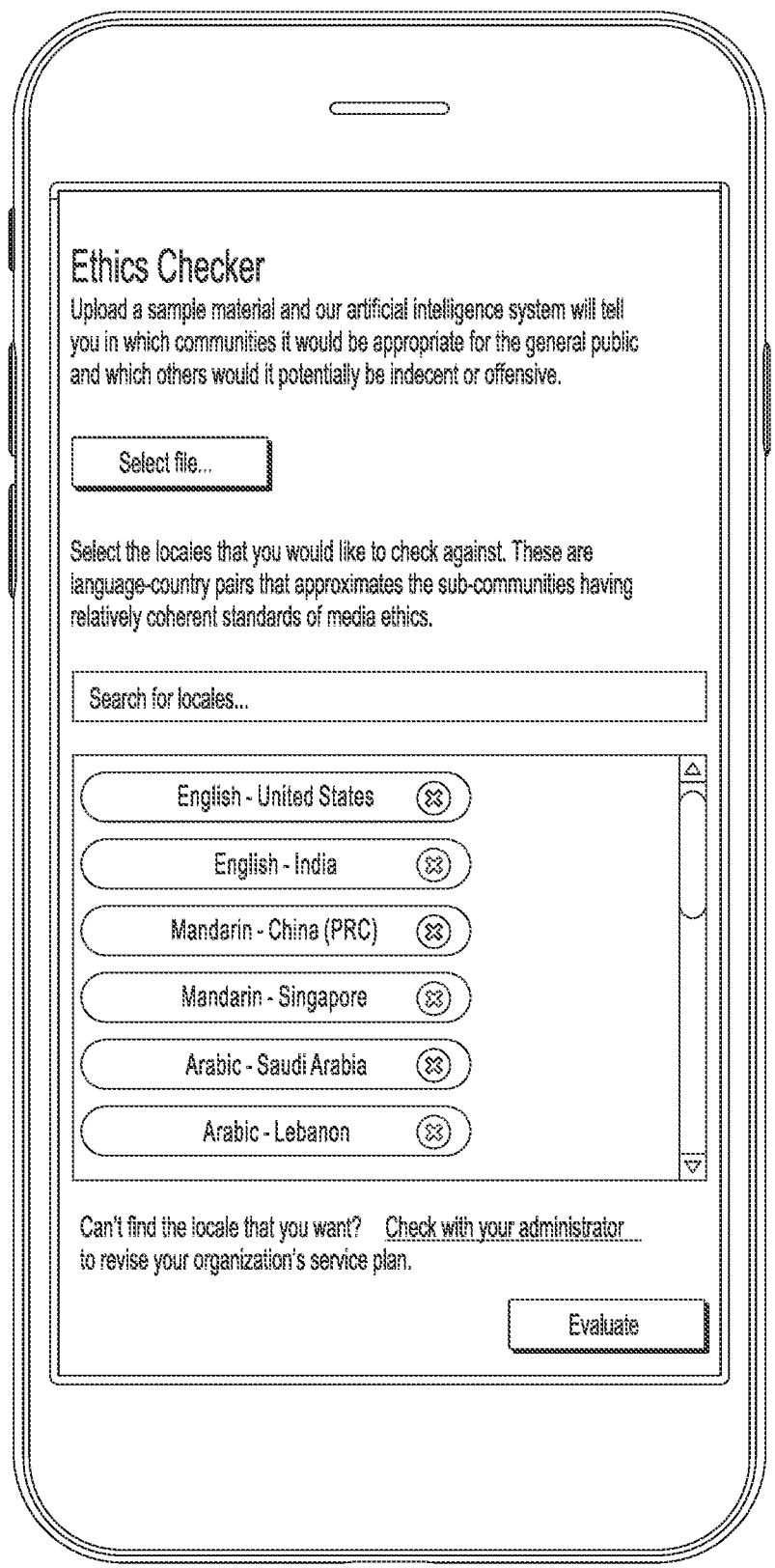
FIGS. 3A, 3B, and 4 depict example user interfaces in accordance with implementations of the present disclosure.
Figure 3B:
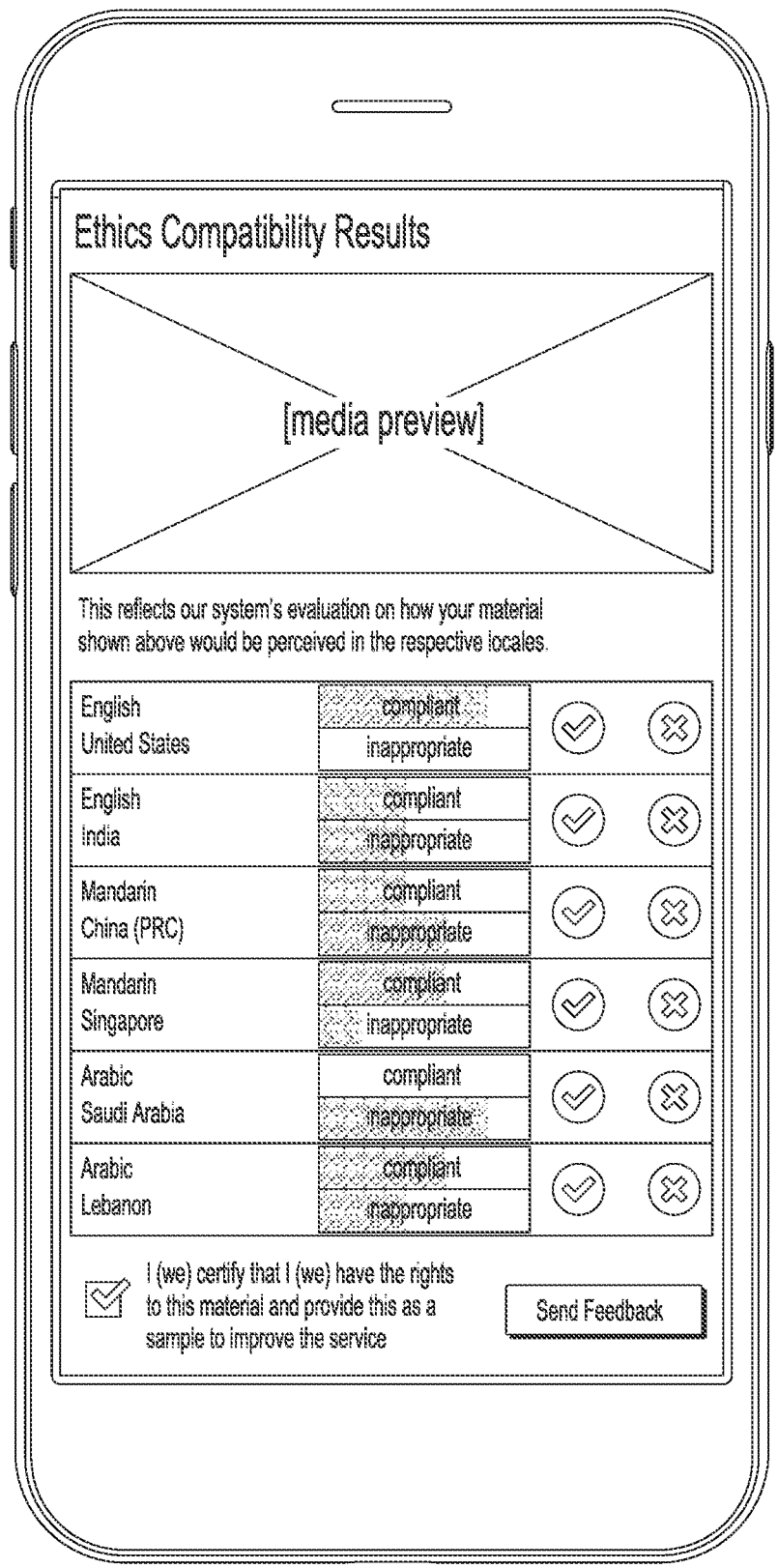
Figure 4:
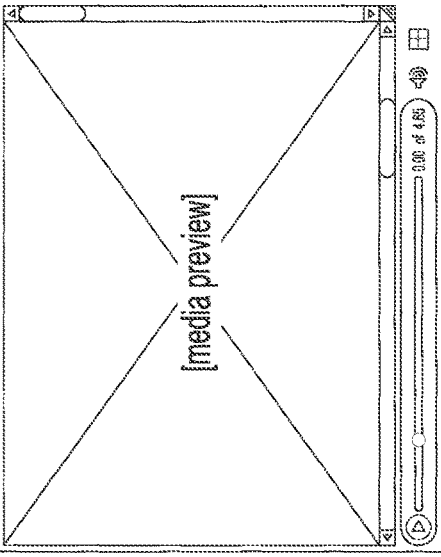

FIGS. 3A, 3B, and 4 depict example UIs (e.g., the UIs 214 of FIG. 2) provided by the ECE platform of the present disclosure.

FIG. 3A is an example of a digital content upload page. In some examples, the digital content upload page enables a user (e.g., the user 218b of FIG. 2) to select and upload a file containing digital content from a user device (e.g., the user device 216b) to the ECE platform. The file uploaded by the user can include digital content that is to be evaluated (e.g., image, text, audio, and/or a video). In some implementations, the digital content upload page enables the user to select locales, for which an ethics rating for the digital content is to be provided. In some examples, the selection of locales displayed in the digital content upload page also includes languages associated with each locale. In some examples, the selection of locales displayed in the digital content upload page is based on the ML models provided within the ECE platform. For example, only locales, for which a ML model is provided within the ECE platform are displayed for selection.

In some implementations, the locales displayed in the digital content upload page are selected based on a subscription associated with the user. For example, a subscription that the user has with the ECE platform can define the locales, for which the user is able to request ethics ratings. If a specific locale of interest to the user is not contained within the selection of locales, the UI provides the user with the option to contact an administrator and request the locale of interest.

As described herein, the ECE platform processes the digital content through the ML models associated with the selected locales, each ML model being specific to a locale. Each ML model provides a respective ethics rating, such that a set of ethics ratings for the uploaded digital content is provided. Each ethics rating in the set of ethics ratings is specific to a locale. In some examples, and as described above, each ethics rating can be specific to a type of the digital content, and a locale.

FIG. 3B is an example of an ethics ratings output page. in some examples, the ethics ratings output page provides a user (e.g., the user 218b of FIG. 2) with a graphical display of a set of ethics ratings generated by the ECE platform for an item of digital content. Each ethics rating in the set of ethics ratings is specific to a locale of a plurality of locales selected by the user (e.g., from the upload page of FIG. 3A). The ethics ratings output page provides a preview of the digital content uploaded by the user. In some implementations, the ethics rating for each locale of a plurality of locales selected by the user are displayed as a combination of a compliance rating, and an inappropriateness rating. The compliance rating provides the user with a probability that the uploaded digital content will be compliant with the local ethics of a respective locale. The inappropriateness rating provides the user with a probability that the uploaded digital content will be inappropriate based on the local ethics of the respective locale.

As shown in FIG. 3B, the user can provide feedback regarding the set of ethics ratings generated by the ECE platform for the uploaded digital content. In some implementations, feedback includes a statement for each ethics rating in the set of ethics ratings that the user either agrees or disagrees with the rating. In some implementations, feedback received by the ECE platform is subsequently used as training data.

FIG. 4 is an example of a digital content review page. In some examples, the digital content review page provides digital content reviewers, such as members of an ethics board, with a graphical display of an item of digital content requiring review and rating. Reviewers view the digital content within a viewing window of the digital content review page. Based on the content of the digital content, reviewers provide a rating for the digital content for its compliance with the ethics standards of each locale, for which the reviewer has expert ethics knowledge. In some implementations, reviewers input both a compliance rating and an inappropriateness rating for the digital content for each locale, for which the reviewer has expert ethics knowledge. Reviewers can elect to not rate the digital content for a specific locale by selecting the "pass" option for the specific locale. Reviewers submit their ratings of the digital content to the ECE platform (e.g., by pressing the "Review" button) after entering their ratings into the review window.

As shown in FIG. 4, in some implementations, the digital content review page also displays system ratings of the digital content for each of a plurality of locales. In some implementations, system ratings for the digital content are automated ratings generated by the ML model(s) of the ECE platform. In some implementations, system ratings are generated based on an average of all previously submitted reviewer ratings of the digital content for the specific locale.

In some implementations, reviewers communicate with one another using a conversation window of the digital content review page. For example, reviewers submit questions about the digital content through the conversation window by typing their question into the conversation window and pressing "Send." Other reviewers respond to the question by typing their responses into the conversation window and pressing "Send."

Figure 5:
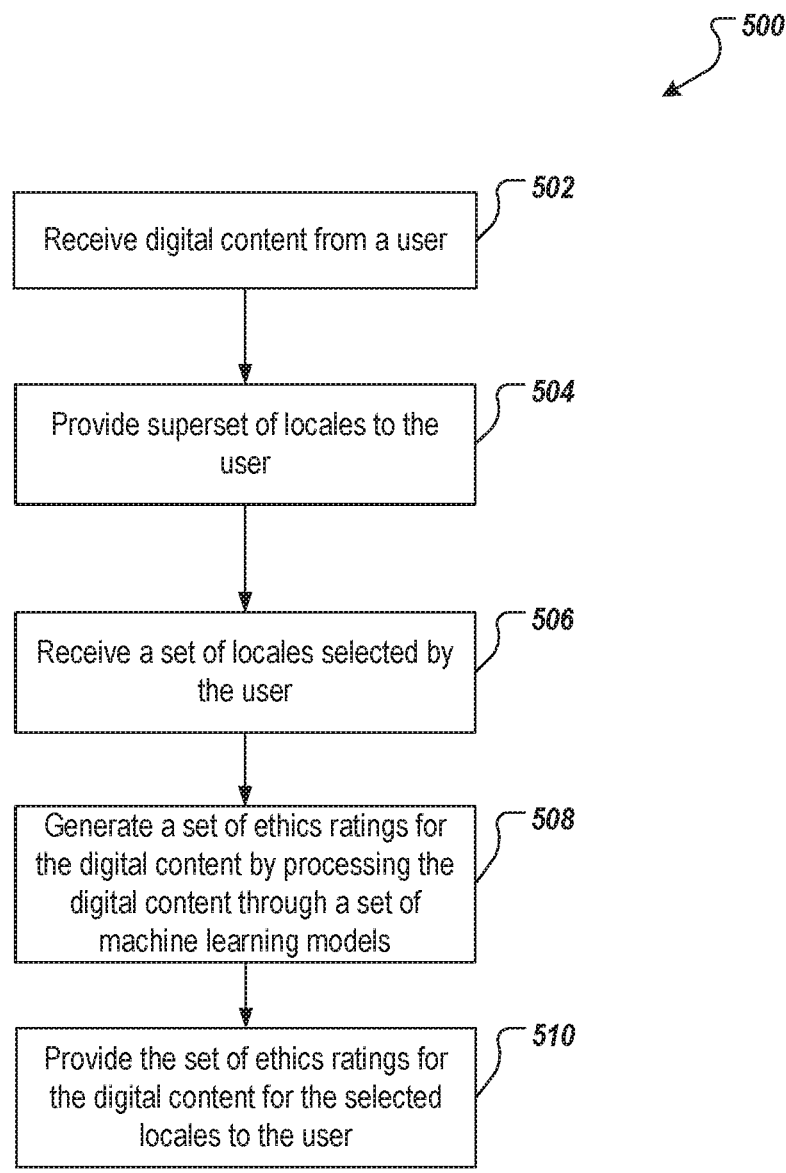
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. For example, the example process 500 can be executed by ECE platform of the present disclosure.

An item of digital content is received (502). For example, digital content in a computer-readable file is received from a user. Example digital content includes, without limitation, images, text, audio, video, and combinations thereof. For example, digital content can include combination of text and images.

A superset of locales is provided to the user (504). In some examples, the superset of locales includes locales, for which the ECE platform can provide an ethics rating (e.g., locales, for which the ECE platform has trained ML models. In some examples, a language associated with each locale can be provided. In some examples, the locales included in the superset of locales provided to the user are based on a subscription associated with the user (e.g., the superset only includes locales, for which the user has subscribed. A set of locales selected by the user is received (506). For example, the user can select one or more locales from the superset of locales to provide the set of locales. In some examples, the user can select all locals of the superset of locales.

A set of ethics ratings for the digital content is generated (508). For example, and as described in further detail herein, a set of ethics ratings for the digital content is generated by processing the digital content through a set of ML models. In some implementations, the ML models are each provided as a neural network. In some implementations, training data includes digital content and associated ethics ratings for a plurality of locales obtained from one or more sources (e.g., online sources, user feedback, and ethics ratings generated by members of an ethics board).

In some implementations, each ML model in the set of ML models is specific to a locale in the set of locales selected by the user. For example, one ML model is specific to the United States, and another ML model is specific to China. In some implementations, each ethics rating in the set of ethics ratings generated by the ML models is specific to a locale of the set of locales selected by the user. For example, the set of ethics ratings can include an ethics rating for the digital content for the United States, and an ethics rating for the digital content for China.

The set of ethics ratings for the digital content for each of the selected locales is provided to the user (510). In some examples, each of the ethics ratings in the set of ethics ratings includes a compliance rating and an inappropriateness rating for the digital content for a specific locale. In some examples, the set of ethics ratings for the digital content is provided to the user by a user interface of the data rating system.

Figure 6:
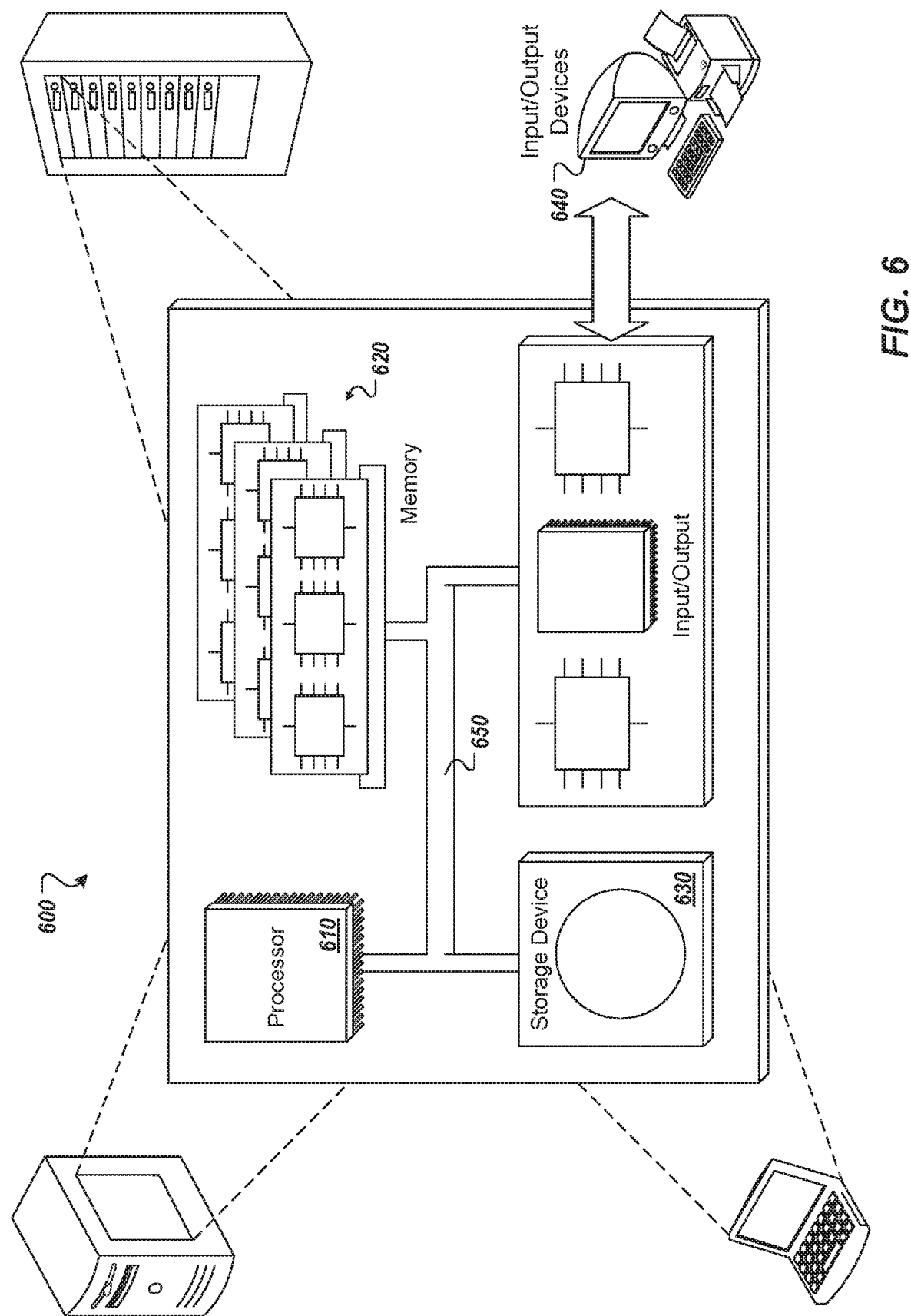
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a plurality of machine learning (ML) models to predict ethics ratings for digital content for specific locales, the method being executed by one or more processors and comprising:
receiving first digital content and a first set of locales;
providing a set of review ethics ratings for the digital content for each locale in the first set of locales to an expert user, the set of review ethics ratings being displayed in a user interface, each review ethics rating comprising a current compliant rating and a current inappropriate rating for a respective locale and being associated with a first user input element and a second user input element for the respective locale within the user interface, the first user input element configured as a slider between compliant ratings and inappropriate ratings to receive user input from the expert user representative of a user-selected ethics rating for a respective review ethics rating, the second user input element configured to receive user input indicating that a user-selected ethics rating is not to be provided for the respective locale;
receiving user input to one or more first user input elements and one or more second user input elements to provide a set of user-selected ethics ratings, the user input to the one or more first user input elements indicating a user-selected ethics rating for respective locales, and the user input to the one or more second user input elements indicating that user-selected ethics ratings are not being provided for respective locales;

providing the set of user-selected ethics ratings as training data to train one or more ML models in the plurality of ML models;

receiving second digital content and a second set of locales;

generating a set of ethics ratings by processing the second digital content through the plurality of ML models, each ML model in the plurality of ML models being specific to a locale of the second set of locales, each ethics rating in the set of ethics ratings being specific to a locale of the second set of locales; and providing the set of ethics ratings for the second digital content to a user.

2. The method of claim 1, wherein each ML model in the plurality of ML models is provided as a neural network.

3. The method of claim 1, wherein each ML model is specific to a type of the digital content.

4. The method of claim 1, wherein the training data used to train each of the ML models comprises digital content and associated ethics ratings for a plurality of locales provided from one or more of online sources, user feedback, and ethics ratings generated by members of an ethics board.

5. The method of claim 1, wherein one or more of the first digital content and the second digital content includes one or more of an image, text, audio, video, and combinations thereof.

6. The method of claim 1, further comprising receiving feedback from the user, the feedback comprising a level of agreement the user has with respect to one or more ethics ratings in the set of ethics ratings.

7. The method of claim 1, wherein each review ethics rating in the set of review ethics ratings comprises one of an average review ethics rating of a set of expert users and a predicted ethics rating output from a ML model in the set of ML models prior to training the ML model using user-selected ethics ratings in the set of user-selected ethics ratings.

8. A non-transitory computer-readable storage medium coupled to one or more processors and having instructions stored thereon which, when executed by the one or more processors, cause the one or more processors to perform operations for providing a plurality of machine learning (ML) models to predict, the operations comprising:

providing a set of review ethics ratings for the digital content for each locale in the first set of locales to an expert user, the set of review ethics ratings being displayed in a user interface, each review ethics rating comprising a current compliant rating and a current inappropriate rating for a respective locale and being associated with a first user input element and a second user input element for the respective locale within the user interface, the first user input element configured as a slider between compliant ratings and inappropriate ratings to receive user input from the expert user representative of a user-selected ethics rating for a respective review ethics rating, the second user input element configured to receive user input indicating that a user-selected ethics rating is not to be provided for the respective locale;

receiving user input to one or more first user input elements and one or more second user input elements to provide a set of user-selected ethics ratings, the user input to the one or more first user input elements indicating a user-selected ethics rating for respective locales, and the user input to the one or more second user input elements indicating that user-selected ethics ratings are not being provided for respective locales;

providing the set of user-selected ethics ratings as training data to train one or more ML models in the plurality of ML models;

receiving second digital content and a second set of locales;

generating a set of ethics ratings by processing the second digital content through the plurality of ML models, each ML model in the plurality of ML models being specific to a locale of the second set of locales, each ethics rating in the set of ethics ratings being specific to a locale of the second set of locales; and providing the set of ethics ratings for the second digital content to a user.

9. The computer-readable storage medium of claim 8, wherein each ML model in the plurality of ML models is provided as a neural network.

10. The computer-readable storage medium of claim 8, wherein each ML model is specific to a type of the digital content.

11. The computer-readable storage medium of claim 8, wherein the training data used to train each of the ML models comprises digital content and associated ethics ratings for a plurality of locales provided from one or more of online sources, user feedback, and ethics ratings generated by members of an ethics board.

12. The computer-readable storage medium of claim 8, wherein one or more of the first digital content and the second digital content includes one or more of an image, text, audio, video, and combinations thereof.

13. The computer-readable storage medium of claim 8, wherein operations further comprise receiving feedback from the user, the feedback comprising a level of agreement the user has with respect to one or more ethics ratings in the set of ethics ratings.

14. The computer-readable storage medium of claim 8, wherein each review ethics rating in the set of review ethics ratings comprises one of an average review ethics rating of a set of expert users and a predicted ethics rating output from a ML model in the set of ML models prior to training the ML model using user-selected ethics ratings in the set of user-selected ethics ratings.

15. A system, comprising:

a computing device; and a computer-readable storage device coupled to the computing device and having instructions stored thereon which, when executed by the computing device, cause the computing device to perform operations for providing a plurality of machine learning (ML) models to predict, the operations comprising:

receiving first digital content and a first set of locales;

providing a set of review ethics ratings for the digital content for each locale in the first set of locales to an expert user, the set of review ethics ratings being displayed in a user interface, each review ethics rating comprising a current compliant rating and a current inappropriate rating for a respective locale and being associated with a first user input element and a second user input element for the respective locale within the user interface, the first user input element configured as a slider between compliant ratings and inappropriate ratings to receive user input from the expert user representative of a user-selected ethics rating for a respective review ethics rating, the second user input element configured to receive user input indicating that a user-selected ethics rating is not to be provided for the respective locale;

receiving user input to one or more first user input elements and one or more second user input elements to provide a set of user-selected ethics ratings, the user input to the one or more first user input elements indicating a user-selected ethics rating for respective locales, and the user input to the one or more second user input elements indicating that user-selected ethics ratings are not being provided for respective locales;

providing the set of user-selected ethics ratings as training data to train one or more ML models in the plurality of ML models;

receiving second digital content and a second set of locales;

generating a set of ethics ratings by processing the second digital content through the plurality of ML models, each ML model in the plurality of ML models being specific to a locale of the second set of locales, each ethics rating in the set of ethics ratings being specific to a locale of the second set of locales; and providing the set of ethics ratings for the second digital content to a user.

16. The system of claim 15, wherein each ML model in the plurality of ML models is provided as a neural network.

17. The system of claim 15, wherein each ML model is specific to a type of the digital content.

18. The system of claim 15, wherein the training data used to train each of the ML models comprises digital content and associated ethics ratings for a plurality of locales provided from one or more of online sources, user feedback, and ethics ratings generated by members of an ethics board.

19. The system of claim 15, wherein one or more of the first digital content and the second digital content includes one or more of an image, text, audio, video, and combinations thereof.

20. The system of claim 15, wherein operations further comprise receiving feedback from the user, the feedback comprising a level of agreement the user has with respect to one or more ethics ratings in the set of ethics ratings.

* * * * *